United States Patent
Konishi et al.

(10) Patent No.: US 7,906,580 B2
(45) Date of Patent: *Mar. 15, 2011

(54) PAINT COMPOSITION, A METHOD OF PAINT FINISHING AND PAINTED OBJECTS

(75) Inventors: Tetsu Konishi, Kanagawa (JP); Shinji Mitsumune, Kanagawa (JP); Masayuki Takemoto, Yokohama (JP); Takehito Ito, Tokyo (JP); Hiroyuki Tagkagi, Yokohama (JP); Rui Nmi, Munster (DE)

(73) Assignee: BASF Coatings Japan Limited, Yokohama-shi (JP)

( * ) Notice: Subject to any disclaimer, the term of this patent is extended or adjusted under 35 U.S.C. 154(b) by 519 days.

This patent is subject to a terminal disclaimer.

(21) Appl. No.: 11/997,631

(22) PCT Filed: Jul. 13, 2006

(86) PCT No.: PCT/IB2006/002057
§ 371 (c)(1),
(2), (4) Date: Feb. 1, 2008

(87) PCT Pub. No.: WO2007/015130
PCT Pub. Date: Feb. 8, 2007

(65) Prior Publication Data
US 2008/0227918 A1    Sep. 18, 2008

(30) Foreign Application Priority Data

Aug. 4, 2005    (JP) .................................. 2005-226286

(51) Int. Cl.
C08F 290/14    (2006.01)
C08L 33/02    (2006.01)
C08L 37/00    (2006.01)

(52) U.S. Cl. ............................ 525/50; 525/221; 525/206
(58) Field of Classification Search .................... 525/50, 525/206, 221
See application file for complete search history.

(56) References Cited

U.S. PATENT DOCUMENTS 4,005,155 A * 1/1977 Sampson et al. .............. 525/162

FOREIGN PATENT DOCUMENTS

| JP | 5171103 A | 7/1993 |
| JP | 2002105397 A | 4/2002 |
| JP | 2003313493 A | 11/2003 |

OTHER PUBLICATIONS

International Search Report of PCT/IB2006/002057 dated Nov. 3, 2006.
International Preliminary Report on Patentability for International application No. PCT/IB2006/002057 dated Feb. 5, 2008.

* cited by examiner

Primary Examiner — William K Cheung
(74) Attorney, Agent, or Firm — Cantor Colburn LLP

(57) ABSTRACT

Disclosed herein is a paint composition, comprising a hydroxyl group containing resin (A), having a hydroxyl group value of from 200 to 400 mgKOH/g, and comprising in a resin solid fraction less than 25 weight % of structural units based on a lactone compound, a hydroxyl group containing resin (B), having a hydroxyl group value of from 50 to 200 mgKOH/g, and comprising in the resin solid fraction from 25 to 75 weight % of structural units based on a lactone compound, and a crosslinking agent (C) comprising at least one functional group which reacts with hydroxyl groups, wherein the proportions by weight (A)/(B) of the hydroxyl group containing resin (A) and the hydroxyl group containing resin (B), based on the resin solid fraction, are from 90/10 to 10/90.

7 Claims, No Drawings

PAINT COMPOSITION, A METHOD OF PAINT FINISHING AND PAINTED OBJECTS

CROSS REFERENCE TO RELATED APPLICATIONS

This application is a National Phase Application of International Patent Application PCT/IB2006/002057, filed on Jul. 13, 2006, which claims priority to Japanese patent application JP 2005-226286, filed on Aug. 4, 2005.

TECHNICAL FIELD

The invention concerns paint compositions, a method of paint finishing and painted objects. More precisely, the invention concerns paint compositions with which, in the automobile painting field, paint films which have excellent car-wash damage resistance, acid resistance, staining resistance, water resistance and weather resistance can be obtained, a method of paint finishing and the painted objects.

BACKGROUND

With the paint films used on automobiles the development of paints which have excellent scratch resistance and durability has proceeded rapidly in view of the problem of scratch damage which arises with car-wash machines for example. In the past softening the paint film itself by reducing the Tg and crosslink density of the paint film and improving the scratch resistance has been considered as a means of resolution which improves the scratch resistance but, although the car-wash damage resistance is improved, this results in the other features such as hardness, staining resistance, acid resistance and the like which are required of the paint film obtained being lost.

Paint compositions which contain as essential components (A) acrylic copolymers of acid value from 25 to 125 and hydroxyl group value from 30 to 150 which contain (meth) acrylic acid derivative units, (B) acrylic copolymer of epoxy equivalent from 230 to 1500 and hydroxyl group value from 30 to 150 which contain unsaturated monomer units which have epoxy groups, where the (A) and (B) components are copolymers which may include structural units based on unsaturated monomers which are ε-caprolactone modifications of acrylic monomers which have hydroxyl groups, and (C) amino resin are known as a method of obtaining paint films which have excellent acid resistance and scratch resistance (for example, see Japanese Unexamined Patent Application Laid Open H5-171103). However, with these paint compositions there is a weakness in that the acid rain resistance is reduced since they have an amino resin as an essential component.

Furthermore, similarly high solid fraction paint compositions which are characterized by the fact that they contain in the proportions indicated (A) from 5 to 30 wt % of hydroxyl group containing lactone modified oligomer of weight average molecular weight not more than 1000 and of which the hydroxyl group value is from 200 to 800, (B) from 5 to 50 wt % of hydroxyl group containing resin of weight average molecular weight from 1,000 to 6,000 and of which the hydroxyl group value is from 50 to 200, (C) from 30 to 70 wt % of polyisocyanate compound and (D) from 3 to 30 wt % of melamine resin are known as paint compositions in which two types of hydroxyl group containing resin are used and which have excellent finished appearance, paint film hardness, acid rain resistance and scratch resistance, and which have a high solid fraction (for example, see Japanese Unexamined Patent Application Laid Open 2002-105397). However, with these paint compositions the glass transition point (Tg) of the paint film is inevitably reduced by the use of the low molecular weight hydroxyl group containing oligomer and there is a weakness in that the staining resistance and the weather resistance are reduced.

Furthermore, paint compositions which have as essential components (a) from 30 to 90 parts by weight of a lactone modified acrylic polyol resin which has been obtained by the ring-opening addition reaction in the absence of a catalyst on adding from 10 to 200 parts by weight of lactone compound to 100 parts by weight of an acrylic polyol resin of which the hydroxyl group value is from 75 to 250 mgKOH/g and the acid value is from 0.5 to 50 mgKOH/g, (b) from 10 to 70 parts by weight of polyisocyanate compound and (c) from 0.01 to 20 parts by weight of a specified alkoxysilane partially hydrolyzed condensate are known as paint compositions where the staining resistance and impact resistance are excellent and where at the same time the appearance, weather resistance, water resistance and the like are also excellent (for example, see Japanese Unexamined Patent Application Laid Open 2003-313493). However, with these paint compositions there is a weakness in that the balance of the paint film performance in terms of the car-wash damage resistance and the acid rain resistance, staining resistance and weather resistance cannot be maintained satisfactorily because of the presence of one type of lactone modifier acrylic polyol resin.

SUMMARY

As a result of thorough research carried out with a view to resolving the abovementioned problems, the inventors have discovered that a paint composition in which resins which have different hydroxyl group values are combined, and which has as essential components two types of hydroxyl group containing resin in which the amounts of lactone compound modification are different and a crosslinking agent which reacts with hydroxyl groups, results in paint films which have excellent car-wash damage resistance, acid resistance, staining resistance, water resistance, and weather resistance.

That is to say, disclosed herein is a paint composition which has as essential components a hydroxyl group containing resin (A) of which the hydroxyl group value is from 200 to 400 mgKOH/g and which contains in the resin solid fraction less than 25 weight % of structural units based on a lactone compound, a hydroxyl group containing resin (B) of which the hydroxyl group value is from 50 to 200 mgKOH/g and which contains in the resin solid fraction from 25 to 75 weight % of structural units based on a lactone compound and a crosslinking agent (C) which contains in one molecule at least one or more functional group which reacts with hydroxyl groups which is characterized in that the proportions of the hydroxyl group containing resin (A) and the hydroxyl group containing resin (B) are as the resin solid fraction weight ratio (A)/(B) from 90/10 to 10/90.

Furthermore, a paint composition is disclosed in which in the abovementioned paint composition at least 30% of the hydroxyl groups of the hydroxyl group containing resin (A) are secondary and/or tertiary hydroxyl groups.

Furthermore, a paint composition is disclosed in which in the abovementioned paint composition the secondary and/or tertiary hydroxyl groups originate from a hydroxyl group containing radically polymerizable monomer.

Furthermore, a paint composition is disclosed in which in the abovementioned paint composition the hydroxyl group containing resin (A) and the hydroxyl group containing resin (B) are acrylic resins of weight average molecular weight from 1,000 to 30,000.

Furthermore, a paint composition is disclosed in which in the abovementioned paint composition the crosslinking agent (C) is an isocyanate compound and/or a melamine resin.

Furthermore, a method of paint finishing is disclosed which is characterized in that the abovementioned paint composition is applied, and it also provides painted objects which have been painted by means of the above-mentioned paint finishing method.

Also disclosed herein are paint films which have excellent acid resistance, staining resistance, water resistance and weather resistance and which have in particular excellent car-wash scratch resistance. Furthermore, the method of paint finishing in which paint compositions of this invention are used provides an excellent appearance, and the painted objects are excellent in terms of the aforementioned paint film performance.

DETAILED DESCRIPTION

Two types of hydroxyl group containing resin, (A) and (B), are used in a paint composition of this invention.

The hydroxyl group containing resin (A) is a resin with a hydroxyl group value of from 200 to 400 mgKOH/g and which contains in the resin solid fraction less than 25 weight % of structural units based on a lactone compound. Examples of the hydroxyl group containing resin (A) include hydroxyl group containing resins such as acrylic resins and polyester resins, but the use of acrylic resins is preferred.

In this invention the role played by the hydroxyl group containing resin (A) is to impart staining resistance and paint film hardness by maintaining an adequate crosslink density in the paint film.

The hydroxyl group value of the hydroxyl group containing resin (A) is from 200 to 400 mgKOH/g, preferably from 200 to 320 mgKOH/g and most desirably from 200 to 280 mgKOH/g. In those cases where the hydroxyl group value is less than 200 mgKOH/g the staining resistance is reduced and paint film hardness is not obtained because the crosslink density of the paint film is inadequate. Furthermore, in those cases where the hydroxyl group value exceeds 400 mgKOH/g appearance failure of the paint film occurs because compatibility with the hardening agent is not obtained.

Furthermore, the hydroxyl group containing resin (A) is a resin which contains in the resin solid fraction less than 25 weight % of structural units based on a lactone compound, but the content is preferably at least 2 weight % and less than 25 weight % and most desirably at least 5 weight % and less than 25 weight %. If the structural units based on a lactone compound included in the hydroxyl group containing resin (A) exceed 25 weight % then the hardness and staining resistance of the paint film obtained are reduced.

The hydroxyl group containing resin (B) is a resin with a hydroxyl group value of from 50 to 200 mgKOH/g and which contains in the resin solid fraction from 25 to 75 weight % of structural units based on a lactone compound. Examples of the hydroxyl group containing resin (B) include hydroxyl group containing resins such as acrylic resins and polyester resins, but the use of an acrylic resin is preferred.

In this invention the role played by the hydroxyl group containing resin (B) is to improve the car-wash damage resistance by imparting flexibility to the paint film.

The hydroxyl group value of the hydroxyl group containing resin (B) is from 50 to 200 mgKOH/g, but it is preferably from 80 to 190 mgKOH/g and most desirably from 100 to 180 mgKOH/g. In those cases where the hydroxyl group value is less than 50 mgKOH/g paint film hardness is not obtained and the staining resistance is reduced, and in those cases where the hydroxyl group value exceeds 200 mgKOH/g appearance failure of the paint film arises because compatibility with the hardening agent is not obtained.

The hydroxyl group containing resin (B) is a resin which contains in the resin solid fraction from 25 to 75 weight % of structural units based on a lactone compound, but the content is preferably from 25 to 60 weight %, and most desirably from 25 to 50 weight %. If the structural units based on a lactone compound included in the hydroxyl group containing resin (B) are less than 25 weight % then the car-wash damage resistance of the paint film obtained is reduced, and if it exceeds 75 weight % then the compatibility of the paint is reduced and the hardness and staining resistance of the paint film are poor.

Furthermore, the weight average molecular weights of the hydroxyl group containing resins (A) and (B) are preferably from 1,000 to 30,000, more desirably from 2,000 to 20,000, and most desirably from 3,000 to 15,000. In those cases where the weight average molecular weight is less than 1,000 there is a tendency for paint film hardness not to be obtained and a tendency for appearance failure to arise at the time of wet-on-wet painting, and in those cases where the weight average molecular weight exceeds 30,000 appearance failure of the paint film tends to arise due to a lowering of compatibility with the hardening agent.

Examples of the lactone compounds which can be used in the invention include β-methyl-δ-valerolactone, γ-valerolactone, δ-valerolactone, δ-caprolactone, γ-caprolactone, ε-caprolactone, β-propiolactone, γ-butyrolactone, γ-nonanoic lactone and δ-dodecalactone, but ε-caprolactone is especially desirable. One of these lactone compounds may be used, or a combination of two or more types may be used.

The abovementioned lactone compounds may be incorporated into the resin by means of a ring-opening addition reaction with the hydroxyl groups of the hydroxyl group containing resin (A) and/or the hydroxyl group containing resin (B), or they may be incorporated into the hydroxyl group containing resin (A) and/or hydroxyl group containing resin (B) by forming a lactone modified hydroxyl group containing radically polymerizable monomer by means of a ring-opening addition reaction with a hydroxyl group of a hydroxyl group containing radically polymerizable monomer beforehand and copolymerizing this lactone modified hydroxyl group containing radically polymerizable monomer.

Furthermore, at least 30% of the hydroxyl groups and preferably at least 40% of the hydroxyl groups included in the hydroxyl group containing resin (A) of this invention are secondary or tertiary hydroxyl groups.

In those cases where less than 30% of the hydroxyl groups which are included in the hydroxyl group containing resin (A) are secondary or tertiary hydroxyl groups a decline in the appearance is liable to arise due to compatibility failure of the paint.

The secondary and/or tertiary hydroxyl groups in the above-mentioned hydroxyl group containing resin (A) and/or hydroxyl group containing resin (B) are preferably introduced into the hydroxyl group containing resin (A) or the hydroxyl group containing resin (B) using a hydroxyl group containing radically polymerizable monomer.

Examples of radically polymerizable monomers which contain a secondary hydroxyl group include 2-hydroxypropyl (meth)acrylate, 3-phenoxy-2-hydroxypropyl (meth)acrylate, 3-chloro-2-hydroxypropyl (meth)acrylate, 2-hydroxypropylmethacrylamide, bis(2-hydroxypropyl)itaconate, and adducts of (meth)acrylic acid and versatic acid glycidyl esters, and examples of radically polymerizable monomers which contain a tertiary hydroxyl group include 2-hydroxypropyl (meth)acrylate, 2-hydroxy-2-methylpropyl (meth) acrylate, 2-methyl-2-hydroxy-1-propyl (meth)acrylate, 3-hydroxy-1,3-dimethylbutyl (meth)acrylate and 3-hydroxy-3-methylbutyl (meth)acrylate, but 2-hydroxypropyl (meth) acrylate is ideal from the viewpoint of ease of procurement. One type, or a combination of two or more types, of radically polymerizable monomer which contains a secondary hydroxyl group or radically polymerizable monomer which contains a tertiary hydroxyl group respectively can be used.

Primary hydroxyl groups may also be present in the hydroxyl group containing resin (A) and the hydroxyl group containing resin (B). The primary hydroxyl groups are preferably introduced using radically polymerizable monomers which have a primary hydroxyl group. Examples of radically polymerizable monomers which contain a primary hydroxyl group include 2-hydroxyethyl (meth)acrylate, 3-hydroxypropyl (meth)acrylate, 4-hydroxybutyl (meth)acrylate, allyl alcohol, and the ethylene oxide and/or propylene oxide adducts of 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate and 4-hydroxybutyl methacrylate. One type, or a combination of two or more types, of radically polymerizable monomer which contains a primary hydroxyl group can be used.

Other radically polymerizable monomers may be used and copolymerized in the hydroxyl group containing resin (A) and the hydroxyl group containing resin (B), and actual examples of these radically polymerizable monomers include methyl acrylate, ethyl acrylate, n-propyl acrylate, isopropyl acrylate, n-butyl acrylate, isobutyl acrylate, sec-butyl acrylate, hexyl acrylate, cyclohexyl acrylate, 2-ethylhexyl acrylate, octyl acrylate, lauryl acrylate, stearyl acrylate, methyl methacrylate, ethyl methacrylate, n-propyl methacrylate, isopropyl methacrylate, n-butyl methacrylate, isobutyl methacrylate, sec-butyl methacrylate, hexyl methacrylate, cyclohexyl methacrylate, 2-ethylhexyl methacrylate, octyl methacrylate, lauryl methacrylate, stearyl methacrylate, styrene, acrylonitrile, methacrylonitrile, acrylamide and methacrylamide, and one type, or a mixture of two or more types, can be used.

A radical polymerization initiator may be compounded when carrying out the radical polymerization of the abovementioned radically polymerizable monomers. Examples of the radical polymerization initiators include azo compounds such as 2,2'-azobisisobutyronitrile, 2,2'-azobis-2,4-dimethylvaleronitrile, 4,4'-azobis-4-cyanovaleric acid, 1-azobis-1-cyclohexanecarbonitrile and dimethyl-2,2'-azobisiso-butyrate; and organic peroxides such as methyl ethyl ketone peroxide, cyclohexane peroxide, 3,5,5-trimethylhexanone peroxide, 1,1-bis(t-butylperoxy)-3,3,5-trimethylcyclohexane, 1,1-bis(t-butylperoxy)cyclohexane, 2,2-bis(t-butyl-peroxy)octane, t-butyl hydroperoxide, diisopropylbenzene hydroperoxide, dicumyl peroxide, t-butylcumyl peroxide, isobutyl peroxide, lauroyl peroxide, benzoyl peroxide, diisopropyl peroxydicarbonate, t-butylperoxy 2-ethylhexanoate, t-butylperoxy neodecanate, t-butylperoxy laurate, t-butylperoxy benzoate and t-butylperoxy isopropyl carbonate. One of these radical polymerization initiators may be used alone, or a combination of two or more types may be used.

No particular limitation is imposed upon the amount of radical polymerization initiator compounded, but an amount of from 0.01 to 20 weight % with respect to the total amount of radically polymerizable monomer is preferred.

Reducing agents such as dimethylaniline, ferrous salts such as ferrous sulfate, ferrous chloride and ferrous acetate, acidic sodium sulfite, sodium thiosulfate and rongalit may be combined in these radical polymerization initiator systems, but care is required with the selection so that the polymerization temperature is not too low.

The organic solvents which are used in the production of the hydroxyl group containing resins (A) and the hydroxyl group containing resins (B) of this invention are preferably solvents which do not have functional groups which react with lactone compounds.

Examples of suitable organic solvents which can be used in the production of the hydroxyl group containing resins (A) and the hydroxyl group containing resins (B) of this invention include alicyclic hydrocarbon solvents such as cyclohexane and ethylcyclohexane, aromatic hydrocarbon solvents such as toluene, xylene, ethylbenzene and aromatic naphtha, ketone solvents such as acetone, methyl ethyl ketone, methyl isobutyl ketone, cyclohexanone and isopherone, ester-based solvents such as ethyl acetate, n-butyl acetate, isobutyl acetate, 3-methoxybutyl acetate and bis(2-ethylhexyl)adipate, ether based solvent such as dibutyl ether, tetrahydrofuran, 1,4-dioxane and 1,3,5-trioxane, and nitrogen-containing solvents such as acetonitrile, valeronitrile, N,N-dimethylformamide and N,N-diethylformamide. The organic solvent may be of one type alone or it may be a mixed solvent comprising a plurality of two or more types. At this time the solid fraction concentration of the hydroxyl group containing resin can be selected optionally within the range where the dispersion stability of the resin is not lost, but preferably the solid fraction concentration is generally from 10 to 70 weight %.

The method of adding the organic solvent and radical polymerization initiator is optional when producing the hydroxyl group containing resins (A) and hydroxyl group containing resins (B) of this invention, but methods in which organic solvent is introduced and the radically polymerizable monomer or an organic solvent solution thereof is added dropwise while stirring or methods in which the organic solvent and radically polymerizable monomer or an organic solvent solution thereof are both added dropwise from a dripping tank are preferred with a view to controlling the heat of polymerization and the heat of reaction.

The polymerization temperature of the abovementioned reactions differs according to the type of radical polymerization initiator and whether or not a reducing agent is used conjointly, but the polymerizations are preferably carried out under conditions of from 50 to 200° C., and more desirably under conditions of from 80 to 160° C. In those cases where the polymerization temperature is below 50° C. phase separation of the radically polymerizable monomer and the hydroxyl group containing resin is liable to occur. On the other hand, in those cases where it exceeds 200° C. side reactions such as unexpected depolymerization occur.

The mixing proportions as the weight ratio of the resin solid fractions used of the hydroxyl group containing resin (A) and the hydroxyl group containing resin (B) in a paint composition in this invention are preferably within the range from 90/10 to 10/90, and most desirably in the range from 80/20 to 40/60. With less than 10 weight % of the hydroxyl group containing resin (B) the car-wash damage resistance of the paint film obtained is reduced, and in those cases where it exceeds 90 weight % the staining resistance and acid rain resistance are reduced.

The crosslinking agents (C) which are used in the paint compositions of this invention are crosslinking agents which have in one molecule at least two, and preferably at least three, functional groups which react with hydroxyl groups, and examples include isocyanate compounds which have in one molecule at least two, and preferably three or more, functional groups such as isocyanate groups or blocked isocyanate groups, and melamine resins, and one type may be used alone or a combination of two or more types may be used.

Examples of polyisocyanate compounds which have two or more isocyanate groups in one molecule include p-phenylene diisocyanate, biphenyl diisocyanate, tolylene diisocyanate, 3,3'-dimethyl-4,4'-biphenylene diisocyanate, 1,4-tetramethylene diisocyanate, hexamethylene diisocyanate, 2,2, 4-trimethylhexane-1,6-diisocyanate, methylenebis (phenylisocyanate), lysine methyl ester diisocyanate, bis (isocyanatoethyl)fumarate, isophorone diisocyanate, methylcyclohexyl diisocyanate, 2-isocyanatoethyl-2,6-diisocyanatohexanoate and the biuret forms of these (with three isocyanate groups in one molecule) and isocyanurate forms of these (with three isocyanate groups in one molecule).

The isocyanate compounds where a polyisocyanate compound which has two or more isocyanate groups in one molecule, for example a polyisocyanate such as hexamethylene diisocyanate, phenylene diisocyanate, xylylene diisocyanate or isophorone diisocyanate, has been blocked with a blocking agent such as an active methylene system like methyl acetoacetate or dimethyl malonate or an oxime can be cited as isocyanate compounds which have blocked isocyanate groups.

The alkyl etherified melamine resins are preferred for the melamine resin, and these include the methylolated amino resins obtained by reacting melamine and aldehydes. Examples of the aldehydes include formaldehyde, paraformaldehyde, acetaldehyde and benzaldehyde. Furthermore, those where a methyolated amino resin has been etherified with one type, or two or more types, of lower alcohol can also be used, and the monohydric alcohols such as methyl alcohol, ethyl alcohol, n-propyl alcohol, isopropyl alcohol, n-butyl alcohol, isobutyl alcohol, 2-ethylbutanol and 2-ethylhexanol can be cited as examples of the alcohols which can be used for the etherification. From among these the methylolated melamine resins and the melamine resins where at least some of the methylol groups of a methylolated melamine resin have been etherified with a primary alcohol which has from 1 to 4 carbon atoms are ideal.

Commercial examples of the abovementioned melamine resins include butyl etherified melamine resins such as Yuban 20SE-60 and Yuban 225 (trade names, both produced by the Mitsui Kagaku Co.) and Superbekkamine G840 and Superbekkamine G821 (trade names, both produced by the Dainippon Ink Kagaku Co.), and methyl etherified melamine resins such as Sumimar M-100, Sumimar M-40S and Sumimar M-55 (trade names, all produced by the Sumitomo Kagaku Co.) and Saimer 303, Saimer 325, Saimer 350 and Saimer 370 (trade names, all produced by the Nippon Scitech Industries Co.).

In those cases where isocyanate compounds and melamine resins are used conjointly as crosslinking agents they are preferably used in a solid fraction weight ratio of from 100/0 to 75/25, and most desirably of from 100/0 to 85/15. In those cases where the mixing proportion of melamine resin exceeds 25 weight % the car-wash damage resistance and acid rain resistance of the paint film obtained are reduced.

The mixing ratio of the hydroxyl group containing resin (A) and the hydroxyl group containing resin (B) with the crosslinking agent (C) is preferably such that, as a resin solid fraction weight ratio, when the total of (A) and (B) is 100 parts by weight, from 10 to 190 parts by weight, and more desirably from 15 to 120 parts by weight, of (C) are used. In those cases where the proportion of crosslinking agent is less than 10 parts by weight per 100 parts by weight of hydroxyl group containing resin the staining resistance is reduced and a paint film with adequate hardness is not obtained). Furthermore, in those cases where the proportion exceeds 190 parts by weight a reduction in weather resistance occurs.

The paint compositions of this invention can be used as they are or with the addition, as required, of solvents and various additives, such as ultraviolet absorbers, photo-stabilizers, antioxidants, surfactants, surface controlling agents, hardening reaction catalysts, anti-static agents, perfumes, water removing agents and rheology-controlling agents such as polyethylene wax, polyamide wax and fine internally crosslinked resin particles for example.

The paint compositions of this invention may be used as clear paints, or coloring agents such as dyes, pigments and the like may be compounded and they may be used as colored paints.

The paint compositions of this invention are preferably used as top-coat paint compositions.

The paint finishing method for a top-coat paint composition of this invention is, for example, a two-coat one-bake paint finishing method in which a colored base-coat is painted on the base material and the paint composition of this invention is painted on as a top coat without crosslinking or an over-coating method where a colored base-coat is painted on the base material and a top-coat paint is painted on without crosslinking and, after baking both at the same time, a paint composition of this invention is painted on as an over-coat paint and baked, and there are also methods where in the aforementioned over-coating method a primer paint is painted on to ensure adhesion with the underlying coat and the paint composition of this invention is painted on as an over-coat clear paint without crosslinking.

The aforementioned colored base coat paint, top-coat paint, over-coating clear paint or primer paint is adjusted to the prescribed viscosity by heating or adding an organic solvent or reactive diluent, as required, and the painting is carried out using a painting machine of the type generally used such as an air sprayer, electrostatic air sprayer, roll coater, flow coater or a painting machine with dipping system for example, or using a brush or a bar coater or an applicator, for example. From among these methods spray painting is preferred.

Furthermore, examples of the base material on which a paint composition of this invention is painted include organic materials and inorganic materials such as wood, glass, metal, cloth, plastics, foams, elastomers, paper, ceramics, concrete and plasterboard. These base materials may be materials which have been surface treated beforehand or they may be materials on which a paint film has been formed on the surface beforehand.

Actual examples have been indicated so far, but the method of paint finishing a paint composition of this invention is not limited to just these methods. No particular limitation is imposed upon the thickness of the paint film obtained by painting with a paint composition of this invention but generally the paint film thickness after drying is preferably from 10 to 150 µm, and more desirably from 10 to 100 µm.

Examples of painted objects which can be obtained with a clear composition of this invention include structures, wooden products, metal products, plastic products, rubber products, processed paper, ceramic products, and glass products. In more practical terms these include automobiles, automobile parts (for example bodies, bumpers, spoilers, mirrors, wheels, internal decorative parts and those made of various materials), metal sheets such as steel sheet, bicycles, bicycle parts, street furnishings (for example guard rails, traffic signs and sound-deadening walls), tunnel furnishings (for example side-wall sheets), ships, railway rolling stock, aircraft, furniture, musical instruments, domestic electrical goods, building materials, containers, office equipment, sports goods, toys and the like.

EXAMPLES

The invention is described in more practical terms below by means of illustrative examples, but the invention is in no way limited by these illustrative examples. Moreover, the performance of the paint films obtained with the clear paint compositions of this invention was determined in the ways indicated below.

(1) Appearance

The appearance was evaluated by visual observation in accordance with the following criteria.
◯: When a fluorescent lamp was reflected in the paint film the fluorescent lamp was reflected distinctly.
Δ: When a fluorescent lamp was reflected in the paint film the outline (profile) of the fluorescent lamp was slightly blurred.
X: When a fluorescent lamp was reflected in the paint film the outline (profile) of the fluorescent lamp was markedly blurred.

(2) Hardness

This was evaluated by touching with a finger on the basis of the following criteria.
◯: The paint film did not feel tacky.
Δ: The paint film felt slightly tacky.
X: The paint film felt distinctly tacky.

(3) Car-Wash Damage Resistance

Dirty water (JIS Z-8901-84, a 10/99/1 mixture of type 8 dust/water/neutral detergent) was applied with a brush to a test sheet and then it was cleaned with a car-wash brush rotating at 150 rpm for 10 seconds in an automatic car-wash machine and the test sheet was rinsed with flowing water. This procedure was repeated ten times and then the extent of scratching of the test sheet surface was determined by measuring the L* value with a color difference meter (CR-331, produced by the Minolta Camera Co.). A low numerical value is good.

(4) Acid Resistance

A 40% sulfuric acid aqueous solution (0.2 ml) was placed as a spot on the test sheet and then heated to 60° C. for 15 minutes and then rinsed with water and then the extent to which a mark had been produced was assessed visually.
◯: Virtually no change to be seen in the paint film.
Δ: A slight water mark was seen.
X: A pronounced water mark was seen.

(5) Staining Resistance

Dirty water (JIS Z-8901-84, a 1.3/98/0.5/0.2 by weight mixture of type 8 dust/water/carbon black/yellow ochre) was coated onto a test sheet and then dried for 10 minutes at 50° C. and, after carrying out eight cycles, the paint film was cleaned with a fixed force with a polishing cloth while rinsing with water and the staining mark was assessed visually and evaluated in accordance with the following criteria.
◯: No staining
Δ: Staining material remained in parts.
X: Staining material remained all over.

(6) Water Resistance

After being exposed outdoors for 3 months in accordance with JIS K-5500 (1990) 9.9 Weather Resistance, the color of the unwashed surface of the paint film was measured on the basis of the JIS K-5400 (1990) 7.4.2 color meter measuring method for paint films, the ΔL* value was calculated by subtracting the L* value before the test from the L* value after immersion in warm water at 40° C. for 240 hours and the whitening of the paint film was assessed. A small numerical value is good.

(7) Weather Resistance

The state of the paint film was assessed visually after being exposed for 3000 hours using a sunshine carbon arc lamp type accelerated weather resistance testing machine (JIS K-5400 (1990) 9.8.1).

Examples of Production 1 to 6

The Production of Hydroxyl Group Containing Resin Solutions for Paint Purposes

The xylene of the composition shown in Table 1 was introduced into a four-necked flask which had been furnished with a thermometer, a reflux condenser, a stirrer and a dropping funnel and heated while being stirred under a current of nitrogen and maintained at 140° C. Next, the mixture of monomer and polymerization initiator of the composition shown in Table 1 (the drip-feed component) was drip fed from the dropping funnel at a uniform rate over a period of 2 hours at a temperature of 140° C. After the drip-feed had been completed the temperature of 140° C. was maintained for 1 hour and then the reaction temperature was lowered to 110° C. Subsequently, a polymerization initiator solution of the composition shown in Table 1 (the supplementary catalyst) was added and, after maintaining a temperature of 110° C. for 2 hours, the amount of ε-caprolactam indicated in Table 1 was introduced and the reaction was completed on maintaining a temperature of 150° C. for 3 hours and the hydroxyl group containing resin solution for paint purposes A-1 was obtained. Furthermore, A-2 to A-6 were the same as A-1 except that the amounts of the raw materials introduced shown in Table 1 were changed and the hydroxyl group containing paint resin solutions for paint purposes A-2 to A-6 were obtained. Moreover, the units of the amounts of the raw materials introduced in the tables are parts by weight. This is the same in the following tables.

TABLE 1

| | | Example of Production 1 | Example of Production 2 | Example of Production 3 | Example of Production 4 | Example of Production 5 | Example of Production 6 |
|---|---|---|---|---|---|---|---|
| Hydroxyl group containing resin for paint purposes | | A-1 | A-2 | A-3 | A-4 | A-5 | A-6 |
| Initial Introduction | Xylene | 32.9 | 32.9 | 31.9 | 32.9 | 32.9 | 32.9 |
| Drip-feed Component | 2-Ethylhexyl methacrylate | 15.8 | | 8.5 | 31.1 | 0.1 | 1.1 |
| | 2-Hydroxyethyl acrylate | | | | | 38.9 | |
| | 2-Hydroxyethyl methacrylate | 2.6 | 1.6 | 12.9 | 1.6 | | 5.2 |
| | 2-Hydroxypropyl methacrylate | 35.6 | 52.4 | 24.2 | 21.3 | | 32.7 |
| | 2-Hydroxypropyl acrylate | | | | | 15.0 | |
| | t-Butylperoxy-2-ethylhexanoate | 5.0 | 5.0 | 5.0 | 5.0 | 5.0 | 5.0 |

TABLE 1-continued

|  |  | Example of Production 1 | Example of Production 2 | Example of Production 3 | Example of Production 4 | Example of Production 5 | Example of Production 6 |
|---|---|---|---|---|---|---|---|
| Supplementary Catalyst | t-Butylperoxy-2-ethylhexanoate | 0.1 | 0.1 | 0.1 | 0.1 | 0.1 | 0.1 |
|  | Xylene | 1.0 | 1.0 | 1.0 | 1.0 | 1.0 | 1.0 |
| Supplementary Component | ε-Caprolactone | 6.0 | 6.0 | 15.5 | 6.0 | 6.0 | 21.0 |
|  | Xylene | 1.0 | 1.0 | 1.0 | 1.0 | 1.0 | 1.0 |
| Total |  | 100.0 | 100.0 | 100.0 | 100.0 | 100.0 | 100.0 |
| Resin hydroxyl group value (mgKOH/g) |  | 250 | 350 | 250 | 150 | 420 | 250 |
| Involatile fraction (weight %) |  | 65.1 | 65.1 | 66.1 | 65.1 | 65.1 | 65.1 |
| Weight average molecular weight |  | 5000 | 5000 | 5000 | 5000 | 5000 | 5000 |
| Lactone compound structural unit content in resin solid fraction (weight %) |  | 9.2 | 9.2 | 23.4 | 9.2 | 9.2 | 32.3 |
| Proportion of secondary + tertiary hydroxyl group value in the hydroxyl group value (%) |  | 92.5 | 96.7 | 62.9 | 92.2 | 25.6 | 85.1 |

Examples of Production 7 to 13

The Production of Hydroxyl Group Containing Resin Solutions for Paint Purposes B-1 to B-7

The hydroxyl group containing resin solutions B-1 to B-7 were obtained in the same way as A-1 except that the amounts of the raw materials introduced shown in Table 2 were changed.

TABLE 2

|  |  | Example of Production 7 | Example of Production 8 | Example of Production 9 | Example of Production 10 | Example of Production 11 | Example of Production 12 | Example of Production 13 |
|---|---|---|---|---|---|---|---|---|
| Hydroxyl group containing resin for paint purposes |  | B-1 | B-2 | B-3 | B-4 | B-5 | B-6 | B-7 |
| Initial Introduction | Xylene | 32.9 | 32.9 | 32.9 | 32.9 | 32.9 | 32.9 | 32.5 |
| Drip-feed Component | 2-Ethylhexyl methacrylate | 11.0 | 5.0 | 9.8 | 30.4 | 1.2 | 25.5 |  |
|  | Butyl acrylate | 3.6 | 3.6 |  |  |  |  |  |
|  | 2-Hydroxyethyl acrylate |  |  |  |  |  |  | 7.4 |
|  | 2-Hydroxyethyl methacrylate | 15.8 | 8.5 | 13.8 | 5.6 | 5.3 | 5.3 |  |
|  | 2-Hydroxypropyl methacrylate | 5.5 | 2.9 | 12.5 |  | 29.5 | 17.2 |  |
|  | t-Butylperoxy-2-ethylhexanoate | 5.0 | 5.0 | 5.0 | 5.0 | 5.0 | 5.0 | 5.0 |
| Supplementary Catalyst | t-Butylperoxy-2-ethylhexanoate | 0.1 | 0.1 | 0.1 | 0.1 | 0.1 | 0.1 | 0.1 |
|  | Xylene | 1.0 | 1.0 | 1.0 | 1.0 | 1.0 | 1.0 | 1.0 |
| Supplementary Component | ε-Caprolactone | 24.0 | 40.0 | 24.0 | 24.0 | 24.0 | 12.0 | 53.0 |
|  | Xylene | 1.0 | 1.0 | 1.0 | 1.0 | 1.0 | 1.0 | 1.0 |
| Total |  | 100.0 | 100.0 | 100.0 | 100.0 | 100.0 | 100.0 | 100.0 |
| Resin hydroxyl group value (mgKOH/g) |  | 150 | 80 | 180 | 40 | 230 | 150 | 60 |
| Involatile fraction (weight %) |  | 65.1 | 65.1 | 65.1 | 65.1 | 65.1 | 65.1 | 65.5 |
| Weight average molecular weight |  | 5200 | 5200 | 5200 | 5200 | 5200 | 5200 | 5200 |
| Lactone compound structural unit content in resin solid fraction (weight %) |  | 36.9 | 61.4 | 36.9 | 36.9 | 36.9 | 18.4 | 80.9 |

Examples 14 to 32

The Production of Clear Paints CC-1 to CC-19

The raw materials shown in Tables 3, 4 and 5 were mixed sequentially and stirred in such a way that uniform mixtures were obtained to prepare clear paints.

TABLE 3

|  | Ex. of Prod. 14 | Ex. of Prod. 15 | Ex. of Prod. 16 | Ex. of Prod. 17 | Ex. of Prod. 18 | Ex. of Prod. 19 | Ex. of Prod. 20 |
| --- | --- | --- | --- | --- | --- | --- | --- |
|  | CC-1 | CC-2 | CC-3 | CC-4 | CC-5 | CC-6 | CC-7 |
| A-1 | 60 | 60 | 80 | 20 | 60 |  |  |
| A-2 |  |  |  |  |  | 60 |  |
| A-3 |  |  |  |  |  |  | 60 |
| A-4 |  |  |  |  |  |  |  |
| A-5 |  |  |  |  |  |  |  |
| A-6 |  |  |  |  |  |  |  |
| B-1 | 40 | 40 | 20 | 80 |  |  |  |
| B-2 |  |  |  |  |  | 40 |  |
| B-3 |  |  |  |  | 40 |  | 40 |
| B-4 |  |  |  |  |  |  |  |
| B-5 |  |  |  |  |  |  |  |
| B-6 |  |  |  |  |  |  |  |
| B-7 |  |  |  |  |  |  |  |
| Crosslinking agent Desmodure N3200 | 41 | 34.9 | 41 | 41 | 43.4 | 47.3 | 43.4 |
| Crosslinking agent Yuban SE-60 |  | 15 |  |  |  |  |  |
| Ultraviolet absorber solution | 7 | 7 | 7 | 7 | 7 | 7 | 7 |
| Photo-stabilizer solution | 7 | 7 | 7 | 7 | 7 | 7 | 7 |
| Surface controlling agent solution | 2 | 2 | 2 | 2 | 2 | 2 | 2 |
| Sorbesso 100 | 15 | 15 | 15 | 15 | 15 | 15 | 15 |
| TOTAL | 172 | 180.9 | 172 | 172 | 174.4 | 178.3 | 174.4 |
| Total hydroxyl group value | 210 | 210 | 210 | 210 | 222 | 242 | 222 |
| Resin A | A-1 | A-1 | A-1 | A-1 | A-1 | A-2 | A-3 |
| Resin B | B-1 | B-1 | B-1 | B-1 | B-3 | B-2 | B-3 |
| Resin A/Resin B mass ratio | 60/40 | 60/40 | 80/20 | 20/80 | 60/40 | 60/40 | 60/40 |
| Isocyanate compound/melamine resin weight ratio | 100/0 | 80/20 | 100/0 | 100/0 | 100/0 | 100/0 | 100/0 |
| Hydroxyl group value of resin A | 250 | 250 | 250 | 250 | 250 | 350 | 250 |
| Hydroxyl group value of resin B | 150 | 150 | 150 | 150 | 180 | 80 | 180 |
| Amount of caprolactone structural units in resin A (weight %) | 9 | 9 | 9 | 9 | 9 | 9 | 23 |
| Amount of caprolactone structural units in resin B (weight %) | 36.9 | 36.9 | 36.9 | 36.9 | 36.9 | 61.4 | 36.9 |
| Amount of secondary and tertiary OH group among the OH groups of resin A (%) | 92.5 | 92.5 | 92.5 | 92.5 | 92.5 | 96.7 | 62.9 |

TABLE 4

|  | Ex. of Prod. 21 | Ex. of Prod. 22 | Ex. of Prod. 23 | Ex. of Prod. 24 | Ex. of Prod. 25 | Ex. of Prod. 26 |
| --- | --- | --- | --- | --- | --- | --- |
|  | CC-8 | CC-9 | CC-10 | CC-11 | CC-12 | CC-13 |
| A-1 | 100 |  | 60 | 60 | 60 | 60 |
| A-2 |  |  |  |  |  |  |
| A-3 |  |  |  |  |  |  |
| A-4 |  |  |  |  |  |  |
| A-5 |  |  |  |  |  |  |
| A-6 |  |  |  |  |  |  |
| B-1 |  | 100 | 40 |  |  |  |
| B-2 |  |  |  |  |  |  |
| B-3 |  |  |  |  |  |  |
| B-4 |  |  |  | 40 |  |  |
| B-5 |  |  |  |  | 40 |  |
| B-6 |  |  |  |  |  | 40 |
| B-7 |  |  |  |  |  |  |
| Crosslinking agent Desmodure N3200 | 41 | 41 | 24.6 | 32.4 | 47.3 | 41 |
| Crosslinking agent Yuban SE-60 |  |  | 27.3 |  |  |  |
| Ultraviolet absorber solution | 7 | 7 | 7 | 7 | 7 | 7 |
| Photo-stabilizer solution | 7 | 7 | 7 | 7 | 7 | 7 |

TABLE 4-continued

|  | Ex. of Prod. 21 | Ex. of Prod. 22 | Ex. of Prod. 23 | Ex. of Prod. 24 | Ex. of Prod. 25 | Ex. of Prod. 26 |
|---|---|---|---|---|---|---|
| Surface controlling agent solution | 2 | 2 | 2 | 2 | 2 | 2 |
| Sorbesso 100 | 15 | 15 | 15 | 15 | 15 | 15 |
| TOTAL | 172 | 172 | 182.9 | 163.4 | 178.3 | 172 |
| Total hydroxyl group value | 210 | 210 | 210 | 166 | 242 | 210 |
| Resin A | A-1 | — | A-1 | A-1 | A-1 | A-1 |
| Resin B | — | B-1 | B-1 | B-4 | B-5 | B-6 |
| Resin A/Resin B mass ratio | 100/0 | 0/100 | 60/40 | 60/40 | 60/40 | 60/40 |
| Isocyanate compound/melamine resin weight ratio | 100/0 | 100/0 | 60/40 | 100/0 | 100/0 | 100/0 |
| Hydroxyl group value of resin A | 250 | — | 250 | 250 | 250 | 250 |
| Hydroxyl group value of resin B | — | 150 | 150 | 40 | 230 | 150 |
| Amount of caprolactone structural units in resin A (weight %) | 9 | 9 | 9 | 9 | 9 | 9 |
| Amount of caprolactone structural units in resin B (weight %) | — | 36.9 | 36.9 | 36.9 | 36.9 | 18.4 |
| Amount of secondary and tertiary OH group among the OH groups of resin A (%) | 92.5 | — | 92.5 | 92.5 | 92.5 | 92.5 |

TABLE 5

|  | Ex. of Prod. 27 | Ex. of Prod. 28 | Ex. of Prod. 29 | Ex. of Prod. 30 | Ex. of Prod. 31 | Ex. of Prod. 32 |
|---|---|---|---|---|---|---|
|  | CC-14 | CC-15 | CC-16 | CC-17 | CC-18 | CC-19 |
| A-1 | 60 |  |  |  |  |  |
| A-2 |  | 60 |  |  |  |  |
| A-3 |  |  | 60 |  |  |  |
| A-4 |  |  |  | 60 |  |  |
| A-5 |  |  |  |  |  | 60 |
| A-6 |  |  |  |  | 60 |  |
| B-1 |  |  |  |  | 40 | 40 |
| B-2 |  |  |  |  |  |  |
| B-3 |  |  |  | 40 |  |  |
| B-4 |  |  |  |  |  |  |
| B-5 |  | 40 |  |  |  |  |
| B-6 |  |  |  |  |  |  |
| B-7 | 40 |  | 40 |  |  |  |
| Crosslinking agent Desmodure N3200 | 41 | 34 | 59 | 34 | 31.6 | 98.7 |
| Crosslinking agent Yuban SE-60 |  |  |  |  |  |  |
| Ultraviolet absorber solution | 7 | 7 | 7 | 7 | 7 | 7 |
| Photo-stabilizer solution | 7 | 7 | 7 | 7 | 7 | 7 |
| Surface controlling agent solution | 2 | 2 | 2 | 2 | 2 | 2 |
| Sorbesso 100 | 15 | 15 | 15 | 15 | 15 | 15 |
| TOTAL | 172 | 165 | 190 | 165 | 162.6 | 229.7 |
| Total hydroxyl group value | 174 | 302 | 174 | 162 | 210 | 312 |
| Resin A | A-1 | A-2 | A-3 | A-4 | A-6 | A-5 |
| Resin B | B-7 | B-5 | B-7 | B-3 | B-1 | B-1 |
| Resin A/Resin B weight ratio | 60/40 | 60/40 | 60/40 | 60/40 | 60/40 | 60/40 |
| Isocyanate compound/melamine resin weight ratio | 100/0 | 100/0 | 100/0 | 100/0 | 100/0 | 100/0 |
| Hydroxyl group value of resin A | 250 | 350 | 250 | 150 | 250 | 420 |
| Hydroxyl group value of resin B | 60 | 230 | 60 | 180 | 150 | 150 |
| Amount of caprolactone structural units in resin A (weight %) | 9 | 9 | 23 | 9 | 32 | 9 |
| Amount of caprolactone structural units in resin B (weight %) | 80.9 | 36.9 | 80.0 | 36.9 | 36.9 | 36.9 |
| Amount of secondary and tertiary OH group among the OH groups of resin A (%) | 92.5 | 96.7 | 62.9 | 92.2 | 85.1 | 25.6 |

Notes for the Tables

1) Desmodure N3200: Trade name, biuret type resin of liquid HDI (involatile fraction 100 weight %, NCO content 23 weight %), produced by the Sumica Beyer Urethane Co.

2) Yuban 20ES-60: Trade name, melamine resin solution (involatile fraction 60 weight %), produced by the Mitsui Kagaku Co.

3) Ultraviolet Absorber Solution: Trade name Tinuvin 900, a 20 weight % xylene solution, produced by the Ciba Specialty Chemicals Co.

4) Photo-stabilizer Solution: Trade name Tinuvin 292, a 20 weight % xylene solution, produced by the Ciba Specialty Chemicals Co.

5) Surface Controlling Agent Solution: Trade name BYK-300, a 10 weight % xylene solution, produced by the Bikkukemi Co.

6) Sorbesso 100: Trade name, aromatic petroleum naphtha, produced by the Esso Co.

Examples 1 to 7

Production of Test Specimens and Investigation of Paint Film Performance

The cationic electro-deposition paint Aqua No. 4200 (trade name, produced by the BASF Coatings Japan Co.) was electro-deposition painted so as to provide a dry film thickness of 20 μm on a zinc phosphate treated mild steel sheet and baked for 25 minutes at 175° C. and then the mid-coat paint HS-H300 (trade name, produced by the BASF Coatings Japan Co.) was air-spray painted so as to provide a dry film thickness of 30 μm and baked for 30 minutes at 140° C. Then Belcoat No. 6000 Black (trade name, produced by the BASF coatings Japan Co., paint color: black) which is a solvent-based base-coat paint was air-spray painted in such a way as to provide a dry film thickness of 15 μm and, after setting for 3 minutes at 20° C., the clear paint CC-1 to CC-7 diluted with Sorbesso 100 (trade name, produced by the Esso Co., aromatic petroleum naphtha) to the painting viscosity (Ford cup No. 4, 25 seconds at 20° C.) was air-spray painted with a wet-on-wet system in such a way as to provide a dry film thickness of 40 μm and baked at 140° C. for 30 minutes to produce test specimens.

However, in the case of all of Examples 1 to 7, for the staining resistance test sheets only, the base-coat paint was replaced by Belcoat No. 6000 White (trade name, produced by the BASF coatings Japan Co., paint color: white).

The paint film performance test results are shown in Table 4 and in all cases no paint turbidity arose and paint films with a uniform gloss were obtained, and they exhibited excellent car-wash damage resistance, acid resistance, staining resistance, water resistance and weather resistance.

TABLE 6

|  | Example 1 | Example 2 | Example 3 | Example 4 | Example 5 | Example 6 | Example 7 |
|---|---|---|---|---|---|---|---|
|  | CC-1 | CC-2 | CC-3 | CC-4 | CC-5 | CC-6 | CC-7 |
| Appearance | ○ | ○ | ○ | ○ | ○ | ○ | ○ |
| Hardness | ○ | ○ | ○ | ○ | ○ | ○ | ○ |
| Car-wash Damage Resistance | 5.2 | 5.4 | 6.3 | 5.4 | 4.7 | 7.5 | 4.3 |
| Acid Resistance | ○ | ○ | ○ | ○ | ○ | ○ | ○ |
| Staining Resistance | ○ | ○ | ○ | ○ | ○ | ○ | ○ |
| Water Resistance | 0.3 | 0.2 | 0.5 | 0.4 | 0.4 | 0.2 | 0.8 |
| Weather Resistance | No Abnormality | No Abnormality | No Abnormality | No Abnormality | No Abnormality | No Abnormality | No Abnormality |
| Resin A | A-1 | A-1 | A-1 | A-1 | A-1 | A-2 | A-3 |
| Resin B | B-1 | B-1 | B-1 | B-1 | B-3 | B-2 | B-3 |
| Resin A/B Weight Ratio | 60/40 | 60/40 | 80/20 | 20/80 | 60/40 | 60/40 | 60/40 |
| Isocyanate compound/melamine resin weight ratio | 100/0 | 80/20 | 100/0 | 100/0 | 100/0 | 100/0 | 100/0 |
| Hydroxyl group value of resin A | 250 | 250 | 250 | 250 | 250 | 350 | 250 |
| Hydroxyl group value of resin B | 150 | 150 | 150 | 150 | 180 | 80 | 180 |
| Amount of caprolactone structural units in resin A (weight %) | 9 | 9 | 9 | 9 | 9 | 9 | 23 |
| Amount of caprolactone structural units in resin B (weight %) | 36.9 | 36.9 | 36.9 | 36.9 | 36.9 | 61.4 | 36.9 |
| Amount of secondary and tertiary OH group among the OH groups of resin A (%) | 92.5 | 92.5 | 92.5 | 92.5 | 92.5 | 96.7 | 62.9 |

Comparative Examples 1 to 12

Production of Test Specimens and Investigation of Paint Film Performance

Test specimens were prepared in the same way as in Example 1 except that the clear paints were CC-8 to CC-19. The paint film performance test results are shown in Tables 7 and 8.

TABLE 7

|  | Comparative Example 1 | Comparative Example 2 | Comparative Example 3 | Comparative Example 4 | Comparative Example 5 | Comparative Example 6 |
|---|---|---|---|---|---|---|
|  | CC-8 | CC-9 | CC-10 | CC-11 | CC-12 | CC-13 |
| Appearance | ○ | ○ | ○ | ○ | Δ | ○ |
| Hardness | ○ | Δ | ○ | ○ | ○ | ○ |
| Car-wash Damage Resistance | 17.2 | 7.1 | 25.3 | 15.3 | 19.4 | 17.8 |
| Acid Resistance | ○ | Δ | X | ○ | ○ | ○ |
| Staining Resistance | ○ | Δ | ○ | Δ | ○ | ○ |
| Water Resistance | 0.4 | 1.1 | 0.3 | 0.6 | 0.4 | 0.3 |
| Weather Resistance | No Abnormality | No Abnormality | No Abnormality | No Abnormality | No Abnormality | No Abnormality |
| Resin A | A-1 | — | A-1 | A-1 | A-1 | A-1 |
| Resin B | — | B-1 | B-1 | B-4 | B-5 | B-6 |
| Resin A/B Weight Ratio | 100/0 | 0/100 | 60/40 | 60/40 | 60/40 | 60/40 |
| Isocyanate compound/melamine resin weight ratio | 100/0 | 100/0 | 60/40 | 100/0 | 100/0 | 100/0 |
| Hydroxyl group value of resin A | 250 | — | 250 | 250 | 250 | 250 |

TABLE 7-continued

|  | Comparative Example 1 | Comparative Example 2 | Comparative Example 3 | Comparative Example 4 | Comparative Example 5 | Comparative Example 6 |
|---|---|---|---|---|---|---|
| Hydroxyl group value of resin B | — | 150 | 150 | 40 | 230 | 150 |
| Amount of caprolactone structural units in resin A (weight %) | 9 | 9 | 9 | 9 | 9 | 9 |
| Amount of caprolactone structural units in resin B (weight %) | — | 36.9 | 36.9 | 36.9 | 36.9 | 18.4 |
| Amount of secondary and tertiary OH group among the OH groups of resin A (%) | 92.5 | — | 92.5 | 92.5 | 92.5 | 92.5 |

TABLE 8

|  | Comparative Example 7 | Comparative Example 8 | Comparative Example 9 | Comparative Example 10 | Comparative Example 11 | Comparative Example 12 |
|---|---|---|---|---|---|---|
|  | CC-14 | CC-15 | CC-16 | CC-17 | CC-18 | CC-19 |
| Appearance | Δ | X | X | ○ | ○ | Δ |
| Hardness | Δ | ○ | X | Δ | Δ | ○ |
| Car-wash Damage Resistance | 6.1 | 21.3 | 5.8 | 6.7 | 7.4 | 16.8 |
| Acid Resistance | Δ | ○ | X | ○ | Δ | ○ |
| Staining Resistance | Δ | ○ | Δ | X | Δ | ○ |
| Water Resistance | 1.2 | 0.3 | 1.4 | 0.7 | 0.9 | 0.5 |
| Weather Resistance | No Abnormality | No Abnormality | No Abnormality | No Abnormality | No Abnormality | No Abnormality |
| Resin A | A-1 | A-2 | A-3 | A-4 | A-6 | A-5 |
| Resin B | B-7 | B-5 | B-7 | B-3 | B-1 | B-1 |
| Resin A/B Weight Ratio | 60/40 | 60/40 | 60/40 | 60/40 | 60/40 | 60/40 |
| Isocyanate compound/melamine resin weight ratio | 100/0 | 100/0 | 100/0 | 100/0 | 100/0 | 100/0 |
| Hydroxyl group value of resin A | 250 | 350 | 250 | 150 | 250 | 420 |
| Hydroxyl group value of resin B | 60 | 230 | 60 | 180 | 150 | 150 |
| Amount of caprolactone structural units in resin A (weight %) | 9 | 9 | 23 | 9 | 32 | 9 |
| Amount of caprolactone structural units in resin B (weight %) | 80.9 | 36.9 | 80.9 | 36.9 | 36.9 | 36.9 |
| Amount of secondary and tertiary OH group among the OH groups of resin A (%) | 92.5 | 96.7 | 62.9 | 92.2 | 85.1 | 25.6 |

The invention claimed is:

1. A paint composition, comprising:
a hydroxyl group containing resin (A), having a hydroxyl group value of from greater than 200 to 400 mgKOH/g, and comprising a resin solid fraction having less than 25 weight % of structural units based on a lactone compound,
a hydroxyl group containing resin (B), having a hydroxyl group value of from 50 to 200 mgKOH/g, and comprising a resin solid fraction having from 25 to 75 weight % of structural units based on a lactone compound, and
a crosslinking agent (C) comprising at least one functional group which reacts with hydroxyl groups,
wherein the proportions by weight (A)/(B) of the hydroxyl group containing resin (A) and the hydroxyl group containing resin (B), based on the resin solid fraction, are from 90/10 to 10/90.

2. The paint composition of claim 1, wherein at least 30% of the hydroxyl groups of the hydroxyl group containing resin (A) are secondary hydroxyl groups, tertiary hydroxyl groups, or a combination thereof.

3. The paint composition of claim 2, wherein the secondary hydroxyl groups, tertiary hydroxyl groups, or combination thereof originate from a hydroxyl group containing radically polymerizable monomer.

4. The paint composition of claim 1, wherein the hydroxyl group containing resin (A) and the hydroxyl group containing resin (B) are acrylic resins having an weight average molecular weight of from 1,000 to 30,000.

5. The paint composition of claim 1, wherein the crosslinking agent (C) is at least one of an isocyanate compound, a melamine resin, or a combination thereof.

6. A method of paint finishing, comprising applying the paint composition of claim 1 to an object to produce a painted object.

7. The painted object of claim 6, that is at least one of automobiles, automobile parts, metal sheets, ships, railway rolling stocks, aircrafts, furniture, musical instruments, domestic electrical goods, building materials, containers, office equipment, sports goods, toys, or a combination thereof.

* * * * *